(12) United States Patent
Unal et al.

(10) Patent No.: US 7,991,594 B2
(45) Date of Patent: Aug. 2, 2011

(54) METHOD AND APPARATUS FOR THE RIGID REGISTRATION OF 3D EAR IMPRESSION SHAPES WITH SKELETONS

(75) Inventors: Gozde Unal, West Windsor, NJ (US); Alexander Zouhar, Hillsborough, NJ (US); Gregory G. Slabaugh, Princeton, NJ (US); Tong Fang, Morganville, NJ (US); Jason Jenn-Kwei Tyan, Princeton, NJ (US); Rupen Melkisetoglu, Princeton, NJ (US)

(73) Assignee: Siemens Corporation, Iselin, NJ (US)

( * ) Notice: Subject to any disclaimer, the term of this patent is extended or adjusted under 35 U.S.C. 154(b) by 1226 days.

(21) Appl. No.: 11/462,856

(22) Filed: Aug. 7, 2006

(65) Prior Publication Data

US 2007/0057942 A1    Mar. 15, 2007

Related U.S. Application Data

(60) Provisional application No. 60/723,849, filed on Oct. 5, 2005, provisional application No. 60/716,671, filed on Sep. 13, 2005, provisional application No. 60/723,850, filed on Oct. 5, 2005, provisional application No. 60/723,660, filed on Oct. 5, 2005.

(51) Int. Cl.
*G06F 7/60* (2006.01)
*G06K 9/00* (2006.01)
*G06T 15/00* (2011.01)

(52) U.S. Cl. ............................. 703/2; 382/128; 345/419

(58) Field of Classification Search ...... 703/2; 382/128; 345/419

See application file for complete search history.

(56) References Cited

U.S. PATENT DOCUMENTS

| | | | |
|---|---|---|---|
| 5,142,930 A | 9/1992 | Allen et al. | |
| 5,222,499 A | 6/1993 | Allen et al. | |
| 5,230,338 A | 7/1993 | Allen et al. | |
| 5,951,475 A | 9/1999 | Gueziec et al. | |
| 5,999,840 A | 12/1999 | Grimson et al. | |
| 6,096,050 A | 8/2000 | Audette | |
| 6,144,759 A | 11/2000 | Weese et al. | |
| 6,560,354 B1 | 5/2003 | Maurer et al. | |
| 7,328,080 B2 * | 2/2008 | Fu et al. | 700/118 |
| 2004/0107080 A1 * | 6/2004 | Deichmann et al. | 703/6 |

(Continued)

OTHER PUBLICATIONS

A. Ben Hamza and Hamid Krim, Geodesic Object Representation and Recognition, 2003, DGCI LNCS conference vol. 2886, pp. 378-387.*

(Continued)

*Primary Examiner* — Paul Rodriguez
*Assistant Examiner* — Juan C Ochoa

(57) ABSTRACT

A method of designing hearing aid molds is disclosed whereby skeletons, or simplified models, of two ear impressions are used to register the graphical representations of the molds to facilitate the joint design of hearing aid shells. The center points of at least a portion of contour lines on the surface of each ear impression are identified. Then, for each ear impression, by connecting these center points to each adjacent center point, a skeleton that represents a simplified model of an ear impression is generated. Vectors describing the distance and direction from the points of each skeleton to an anatomical feature of each ear impression are identified to obtain a correspondence between the points of each skeleton. Three-dimensional translations and rotations of a feature vector of at least one of the skeletons are determined to achieve alignment of the skeleton of one ear impression with the skeleton of another impression.

27 Claims, 7 Drawing Sheets

U.S. PATENT DOCUMENTS

| | | | |
|---|---|---|---|
| 2004/0165740 A1 | 8/2004 | Fang et al. | |
| 2004/0165741 A1 | 8/2004 | Fang et al. | |
| 2004/0264724 A1 | 12/2004 | Fang et al. | |
| 2005/0088435 A1* | 4/2005 | Geng | 345/419 |

OTHER PUBLICATIONS

Audette, M.A., et al., "An Algorithmic Overview of Surface Registration Techniques for Medical Imaging", Medical Image Analysis, Oxford University Press, 1999.

Chui, H., et al., "A New Point Matching Algorithm for Non-Rigid Registration," in Proceedings of Computer Vision and Pattern Recognition, 2000, pp. 44-51.

Huang, X., et al., "Establishing Local Correspondences Towards Compact Representations of Anatomical Structures," in MICCAI, 2003, p. 926-934.

Paragios, N., et al., "Matching Distance Functions: A Shape-to-Area Variational Approach for Global-to-Local Registration," in ECCV, 2002, pp. 775-790.

Delingette, H., et al., "Shape Representation and Image Segmentation Using Deformable Surfaces," Image and Vision Comp., vol. 10, No. 3, pp. 132-144, 1992.

Hebert, M., et al., "A Spherical Representation for the Recognition of Free-Form Surfaces," IEEE Transactions on PAMI, vol. 17, No. 7, Jul. 1995.

Zhang, D., et al., "Harmonic Maps and Their Applications in Surface Matching," Proc. of IEEE Conference on Computer Vision and Pattern Recognition, 1999, vol. 2, pp. 524-530.

Johnson, A.E., et al., "Using Spin-Images for Efficient Object Recognition in Cluttered 3D Scenes," IEEE Transactions on PAMI, vol. 21, No. 5, pp. 433-449, 1999.

Solina, F., et al., "Recovery of Parametric Models from Range Images:The Case for Superquadrics w/Global Deformations," IEEE Transactions on PAMI, vol. 12, No, 2, p. 131,1990.

Wu, K., et al., "Recovering Parametric Geons from Multiview Range Data," Proc. of IEEE Conference on Computer Vision and Pattern Recognition, pp. 159-166, 1994.

Basri, R, et al., "Determining the Similarity of Deformable Shapes," Proc. of ICCV Workshop on Physics-Based Modeling in Computer Vision, pp. 135-143, 1995.

Siddiqi, K., et al., "Shock Graphs and Shape Matching," Int'l Journal of Computer Vision, vol. 35, No. 1, pp. 13-32, 1999.

Bardinet, E., et al., "Structural Object Matching," Technical Report, Dept. of Computer Science and AI, Univ. of Granada, Spain 2000.

Bloomenthal, J., et al., "Skeletal Methods of Shape Manipulation," Shape Modeling and Applications, pp. 44-47, IEEE 1999.

D.W. Storti, et al., "Skeleton-Based Modeling Operations on Solids," Solid Modeling, pp. 141-154, 1997.

Brennecke, A., et al., "3D Shape Matching Using Skeleton Graphs," Simulation and Visualization, 2004.

Maintz, J.B.A., et al., "A Survey of Medical Image Registration," Medical Image Analysis, vol. 2, No. 1, pp. 1-36, 1998.

Besl, P.J., et al., "A Method for Registration of 3-D Shapes," IEEE Trans. on PAMI, vol. 14, No. 2, pp. 239-256, 1992.

Rusinkiewicz, S., et.al., "Efficient Variants of the ICP Algorithm," in Proceedings of the Third Intl. Conf. on 3-D Digital Imaging and Modeling, 2001, pp. 1-8.

Horn, B.K.P., "Closed-Form Solution of Absolute Orientation Using Unit Quaternions," J. of Optical Soc. of Amer., vol. 4, p. 629, Apr. 1987.

Zouhar, A., et al., "Anatomically-Aware, Automatic, and Fast Registration of 3D Ear Impression Models," 3rd Intl Symp. on 3D Data Proc. Visual. & Trans. (3DPVT) 2006.

Osada, R., et al., "Matching 3D Models with Shape Distributions," Proc. of International Conference on Shape Modeling & Applications, 2001, p. 154.

Srihari, et al., "Representation of Three-Dimensional Digital Images," Computing Surveys, vol. 13, No. 4, 1981.

Yamany, S. M., et al., "Novel Surface Registration Using the Grid Closest Point (GCP) Transform," IEEE Int'l Conf. on Image Processing, ICIP '98, vol. 3, pp. 809-813,1998.

Grenness Malcolm J et al: "Mapping ear canal movement using area-based surface matching" Journal of the Acoustial Society of America, AIP/ Acoustial Society of America, Melville, NY, US, vol. 111, No. 2, Feb. 2002, pp. 960-971.

Cornea et al., "3D object retrieval using Many-to-many matching of curve skeletons", Fibres and optical passive components,2005. Proceedings of 2005 IEEE/LEOS workshop on Cambridge MA, USA Jun. 13-17, 2005 pp. 366-371.

Sundar et al., "Skeleton based shape matching and retrieval", Shape modeling international May 12-15, 2003, Piscatway, NJ, USA, IEEE, pp. 130-290.

Trahanias, "Binary Shape recognition using the morphological skeleton transform", Pattern recognition, elsevier, GB, vol. 25 No. 11, Nov. 1, 1992. pp. 1277-1288.

"Machine Vision: Theory, Algorithms, Practicalities", Chapter 7, Boundary Pattern Analysis, pp. 171-191, Academic Press Inc., 1999.

* cited by examiner

METHOD AND APPARATUS FOR THE RIGID REGISTRATION OF 3D EAR IMPRESSION SHAPES WITH SKELETONS

This patent application claims the benefit of U.S. Provisional Application No. 60/723,849, filed Oct. 5, 2005, which is hereby incorporated by reference herein in its entirety.

CROSS-REFERENCE TO RELATED APPLICATIONS

The present application is also related to U.S. patent application Ser. No. 11/462,804, titled Method and Apparatus for the Registration of 3D Ear Impression Models; U.S. patent application Ser. No. 11/462,869, titled Method and Apparatus for Aperture Detection of 3D Hearing Aid Shells; and U.S. Pat. No. 7,801,708, U.S. patent application Ser. No. 11/462,834, titled Method and Apparatus for the Rigid and Non-Rigid Registration of 3D Shapes, all of which are being filed simultaneously herewith and are hereby incorporated by reference herein in their entirety.

BACKGROUND OF THE INVENTION

The present invention relates generally to the registration of three-dimensional objects and, more particularly, to the registration of three-dimensional ear impression models.

The manufacturing of medical devices designed to conform to anatomical shapes, such as hearing aids, has traditionally been a manually intensive process due to the complexity of the shape of the devices. FIG. 1A shows a diagram of a human ear that is, for example, the ear of a patient requiring a hearing aid. Specifically, ear 100 has various identifiable parts such as, for example, aperture 102, crus 103, canal 104, concha 105 and cymba 106. As one skilled in the art will recognize, in order to produce a hearing aid for the patient, an ear impression is typically taken. Various processes for taking such ear impressions have been developed, but most such processes typically involve inserting a pliable material into an ear and allowing that material to harden so that, when it is removed, the contours of the different parts of the ear, such as parts 102-106 of FIG. 1A, are accurately reflected on the impression. Such an ear impression reflecting the parts of ear 100 of FIG. 1A is shown in FIG. 1B. More particularly, ear impression 101 has aperture portion 102A corresponding to aperture 102 of FIG. 1A; crus portion 103A corresponding to crus 103 of FIG. 1A; canal portion 104A corresponding to canal 104 in FIG. 1A; concha portion 105A corresponding to concha 105 of FIG. 1A; cymba portion 106A corresponding to cymba 106; and lower body portion 107A.

Different methods have been used to create ear molds, or shells from ear impressions. One skilled in the art will recognize that the terms ear mold and ear shell are used interchangeably and refer to the housing that is designed to be inserted into an ear and which contains the electronics of a hearing aid. Traditional methods of manufacturing such hearing aid shells typically require significant manual processing to fit the hearing aid to a patient's ear by, for example, sanding or otherwise removing material from the shell in order to permit it to conform better to the patient's ear. More recently, however, attempts have been made to create more automated manufacturing methods for hearing aid shells. In some such attempts, ear impressions are digitized and then entered into a computer for processing and editing. One way of obtaining such a digitized model uses a three-dimensional laser scanner, which is well known in the art, to scan the surface of the impression both horizontally and vertically. The result of such scanning is a digitized model of the ear impression having a plurality of points, referred to herein as a point cloud representation, forming a graphical image of the impression in three-dimensional space. This digitized model can then be digitally manipulated or edited as desired. FIG. 2 shows an illustrative point cloud graphical representation 201 of the hearing aid impression 101 of FIG. 1B. As one skilled in the art will recognize, the number of points in this graphical point cloud representation is directly proportional to the resolution of the laser scanning process used to scan the impression. For example, such scanning may produce a point cloud representation of a typical ear impression that has 30,000 points.

Once such a digitized model of an ear shell has been thus created, then various computer-based software tools have been used to manually edit the graphical shape of each ear impression individually to create a model of a desired type of hearing aid for that ear. As one skilled in the art will recognize, such types of hearing aids may include in-the-ear (ITE) hearing aids, in-the-canal (ITO) hearing aids, completely-in-the-canal (CIC) hearing aids and other types of hearing aids. Each type of hearing aid requires different editing of the graphical model in order to create a model of a desired hearing aid shell size and shape according to various requirements. These requirements may originate from a physician, from the size of the electronic hearing aid components to be inserted into the shell or, alternatively, may originate from a patient's desire for specific aesthetic and ergonomic properties.

Once the desired three-dimensional hearing aid shell design is obtained, various computer-controlled manufacturing methods, such as well known lithographic or laser-based manufacturing methods, are then used to manufacture a physical hearing aid shell conforming to the edited design out of a desired shell material such as, for example, a biocompatible polymer material.

SUMMARY OF THE INVENTION

The present inventors have recognized that, while the aforementioned methods for designing hearing aid shells are advantageous in many regards, they are also disadvantageous in some aspects. In particular, prior attempts at computer-assisted hearing aid manufacturing typically treat each ear mold individually, requiring the manual processing of digitized representations of individual ear impressions. Such attempts have typically relied on the manual identification of the various features of an ear impression and individual editing of the graphical model of each ear impression. However, the present inventors have recognized that it is desirable to be able to simultaneously process in an automated fashion two ear molds corresponding to, for example, each ear of a patient, in order to decrease the time required to design the hearing aid molds.

Accordingly, the present inventors have invented an improved method of designing hearing aid molds whereby two shapes corresponding to graphical images of two ear impressions are registered with each other to facilitate joint processing of the hearing aid design. In particular, the present inventors have invented an improved method of designing hearing aid molds whereby the points of skeletons, or simplified models, of ear impressions are used to register the graphical representations of the molds. In a first embodiment, a plurality of contour lines associated with an ear impression are determined. These contour lines are illustratively determined by orienting a graphical representation of the ear impression in a desired orientation, such as vertically in three-dimensional space. Then, a plane, such as a horizontal plane, is caused to intersect with the graphical representation at different levels. Contour lines are determined by identifying where the plane intersects the surface of the graphical representation. In another embodiment, a skeleton associated with these contour lines is identified by first determining the center points of at least a portion of the contour lines and then by connecting these center points to each adjacent center point. Once skeletons for each ear impression to be registered have been identified then, in yet another embodiment, a distance measure, also referred to herein as a feature vector, representing the distance and direction from the points of each skeleton to one or more anatomical features of each corresponding ear impression are identified. By comparing these distance measurements for each point on each ear impression, corresponding points on a second skeleton are identified for the points of a first skeleton. Based upon the skeletons and distance measurements, three-dimensional translations and rotations of at least one of the skeletons are determined to achieve alignment of the points on the first skeleton with the corresponding points on the second skeleton. In this way two ear impressions are aligned in a manner that facilitates the time-efficient simultaneous editing of the design of hearing aid molds corresponding to the two impressions.

These and other advantages of the invention will be apparent to those of ordinary skill in the art by reference to the following detailed description and the accompanying drawings.

DETAILED DESCRIPTION OF THE INVENTION

Figure 1A:
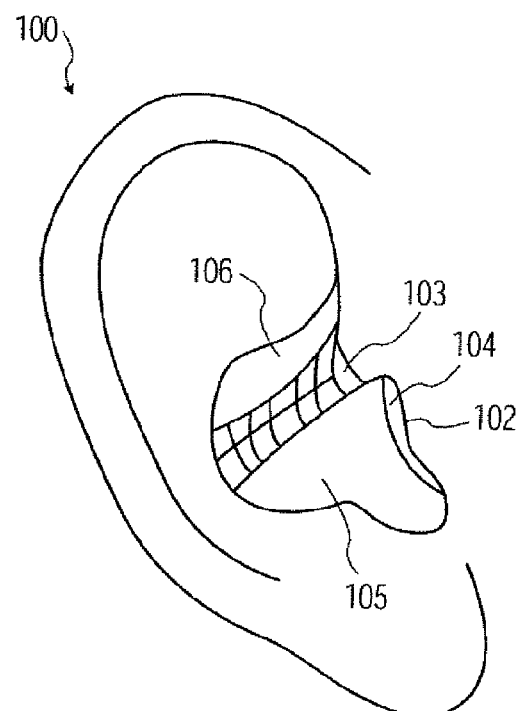
FIG. 1A shows a graphical depiction of an ear of a patient to be fitted with a hearing aid.
Figure 1B:
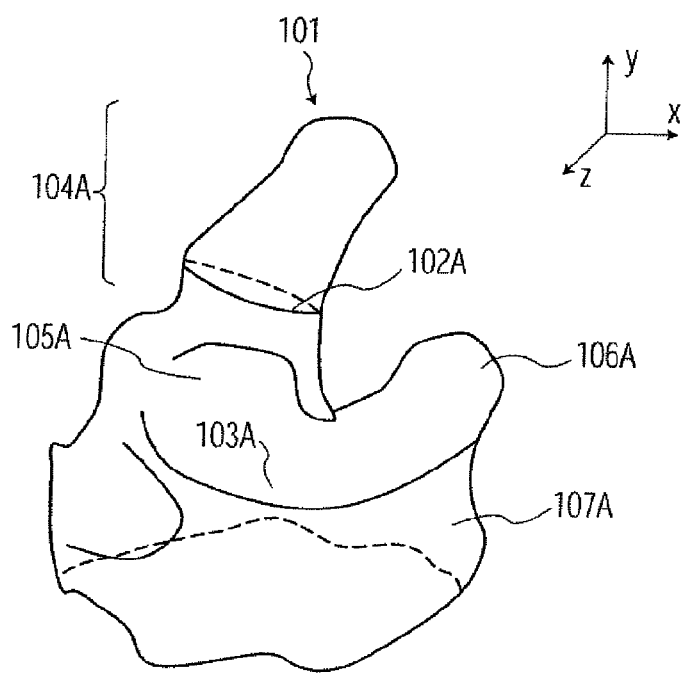
FIG. 1B shows an ear impression taken of the ear of FIG. 1A.

The present inventors have recognized that it is desirable to use registration techniques to align two ear impressions with each other, for example the ear impressions of both ears of a patient, in order to improve the design process of hearing aid shells. Registration of two different surfaces is a fundamental task with numerous potential applications in various fields. As is well known and as used herein, registration is generally defined as the alignment of two surfaces through the use of various three-dimensional transformation techniques, such as, for example, three dimensional surface rotation and translation. Registration typically involves aligning two shapes in such a way as to allow the comparison of the shapes, for example, to identify similarities and differences between those shapes. While such registration is a fundamental technique and can be very useful, the registration of two complex three-dimensional (3D) shapes, such as shapes formed by ear impressions used in the manufacture of hearing aids, is not trivial. In fact, in such cases, registration may be very computationally and practically difficult. Prior registration attempts in various fields have typically represented shapes to be registered using point-based methods, feature-based methods, model-based methods or other similar methods. As one skilled in the art will recognize, point-based methods model a surface by representing that surface using a number of points. For example, as discussed above, a typical representation of an ear impression may consist of 30,000 such points on the surface to be registered. Once such a representation has been created, various calculations are then made to align each point on one surface with a corresponding point on another surface. Model-based registration methods, on the other hand use statistical modeling methods, instead of surface points, to describe the surfaces of a shape.

Such prior point-based and model-based registration methods typically do not attempt to simplify the representation of the surface to a more compact description of that surface (i.e., to reduce the amount of information that requires processing during registration) but, instead, use all or a large subset of all the points on the surface to describe a shape. Thus, these methods are very computationally intensive.

Feature-based methods, on the other hand, are useful for reducing the amount of information used to register two shapes. Such methods typically represent different landmarks or features of a shape as lower dimensional shapes, such as cylinders, quadrics, geons, skeletons and other such simplified geometric shapes. In such attempts, these landmarks or features on a surface are typically identified manually which increases the time required to perform the registration process. In addition, such attempts are typically not consistently repeatable due to the subjective nature of manually identifying simple shapes. Finally, as one skilled in the art will recognize, feature-based registration methods are further limited because the use of such simplified shapes typically leads to relatively rough registration results.

Therefore, the present inventors have recognized that, instead of using prior point, model or feature-based registration methods, or other known registration techniques, it is desirable to perform the registration of ear impressions using actual anatomic regions to align two impressions. In particular, the present inventors have recognized that it is desirable to use a skeleton representation of two ear impressions together with the relationship between the skeletons and known anatomical features of the impressions to register those ear impressions with each other. As used herein, the term skeleton representation is defined as one or more lines or curves that are used as a relatively simplistic model of a more complex shape, such as, illustratively, a three-dimensional ear impression. Once registered, various editing operations may be used as described above to remove or reshape the different surfaces of both ear impressions simultaneously in order to create a model of an ear shell for a hearing aid.

Figure 2:
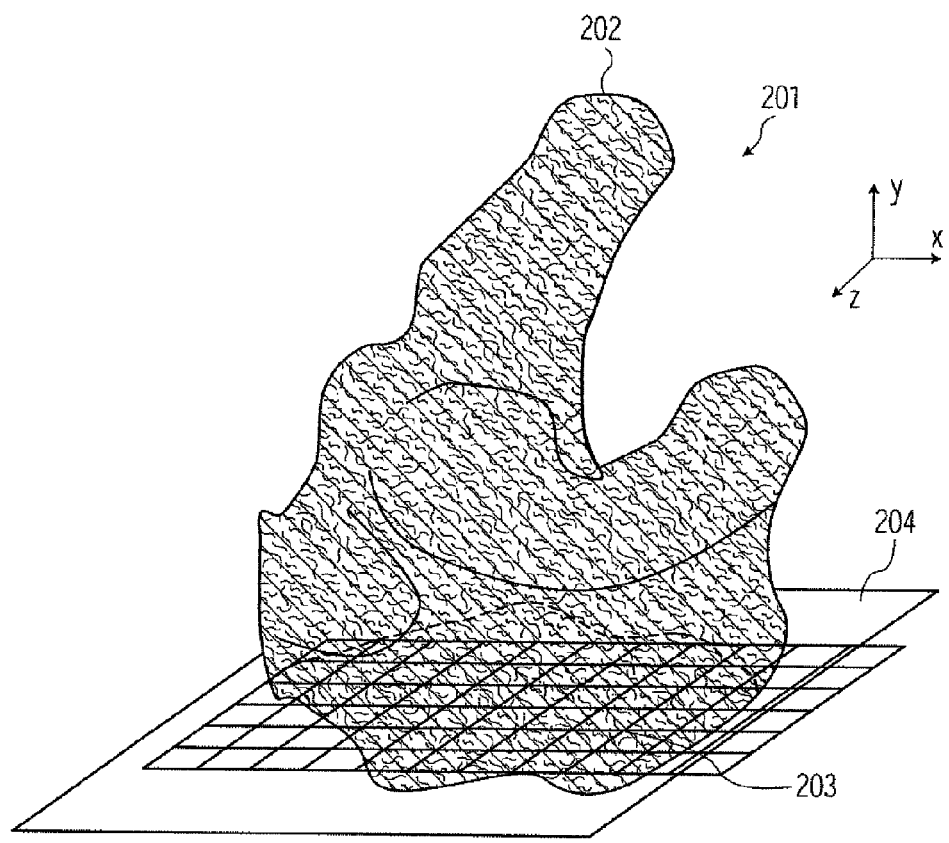
FIG. 2 shows a point cloud representation of the ear impression of FIG. 1B.

In order to use a method such as that described above, a skeleton must first be generated for each impression. One skilled in the art will recognize that various methods of generating skeletons for three-dimensional shapes are possible. In accordance with an embodiment of the present invention, a skeleton of an ear impression is automatically identified. Referring once again to FIG. 2, in order to accomplish such automatic identification, in accordance with this embodiment the point cloud representation 201 along the y-axis of an ear impression is first oriented such that the tip 202 of the impression is oriented vertically as the highest portion of the point cloud representation 201 and the base 203 of the impression is oriented on plane 204 as the lowest portion of the point cloud representation. It will be obvious to one skilled in the art how to achieve such an orientation of a point cloud representation. For example, during laser scanning, typically the base 203 of the ear impression is not actually scanned since the base portion of any resulting ear mold does not have to conform to any anatomical region. As a result, the base of a scanned impression is typically represented as an opening in the bottom area of the point cloud representation 201 of the ear impression. Vertical orientation of the representation may be accomplished, for example, by using well-known principle component analysis techniques to align this opening with plane 204. It will be obvious to one skilled in the art in light of the teachings herein that various other orientations, other than a vertical orientation, may be used with equally advantageous results.

Figure 3:
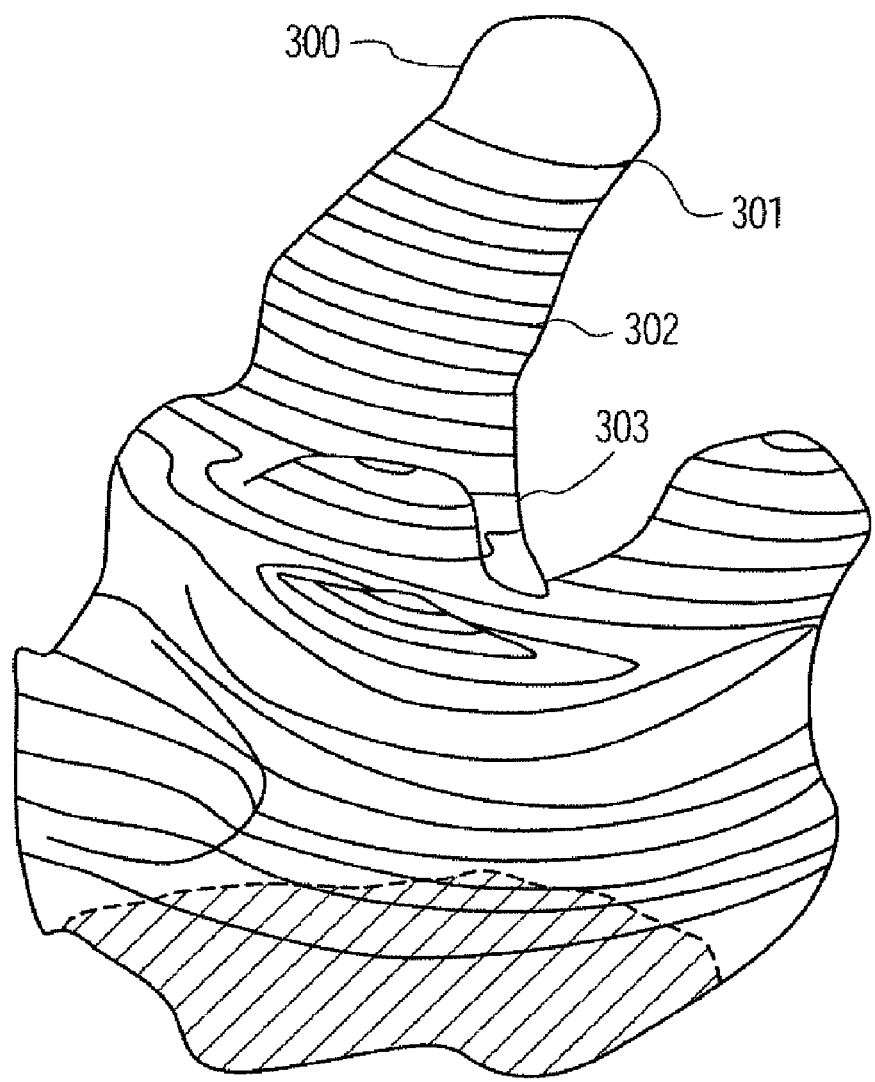
FIG. 3 shows a graphical point cloud representation in accordance with an embodiment of the present invention whereby a plurality of horizontal slices are obtained by intersecting a horizontal plane with the representation of FIG. 2.
Figure 4:
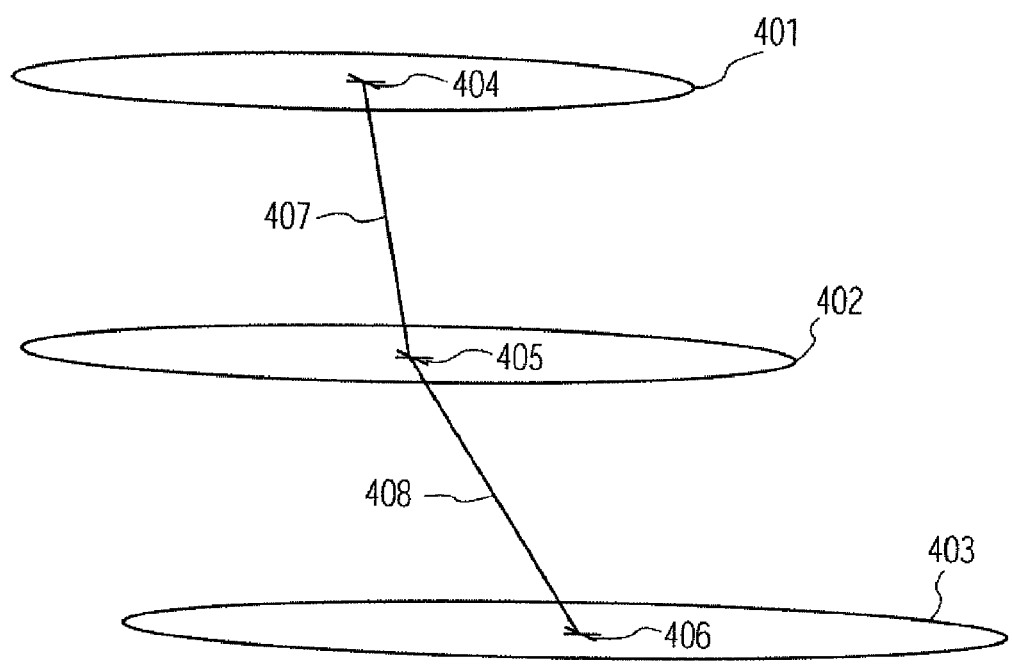
FIG. 4 shows a portion of the contour lines of FIG. 3 and how the center points of those contour lines can be connected to form a portion of a skeleton of an ear impression in accordance with an embodiment of the present invention.

Next, according to this embodiment, once the ear impression has been vertically oriented, a plurality of horizontal slices are taken of the point cloud representation. These slices are taken, for example, by moving a horizontal plane, such as a plane parallel to plane 204, down the point cloud representation along the y-axis from the canal tip area 202 of FIG. 2 towards the base area 203 of FIG. 2 and identifying the intersection of that plane with the surface of the point cloud representation 201. Such an intersection of a plane with the surface of the point cloud representation 201 will result in one or more contour lines on that plane. FIG. 3 shows the contour lines that represent how the horizontal plane will intersect the surface of the ear impression to create slices 305 in the point cloud representation. FIG. 4, discussed further herein below, shows a view of three illustrative contour lines 401, 402 and 403 corresponding to slices 301, 302 and 303 of FIG. 3. Contour lines 401, 402 and 403 are merely representative in nature and one skilled in the art will recognize that such contour lines will typically be more complex shapes than the oval shapes of FIG. 4.

Figure 5:
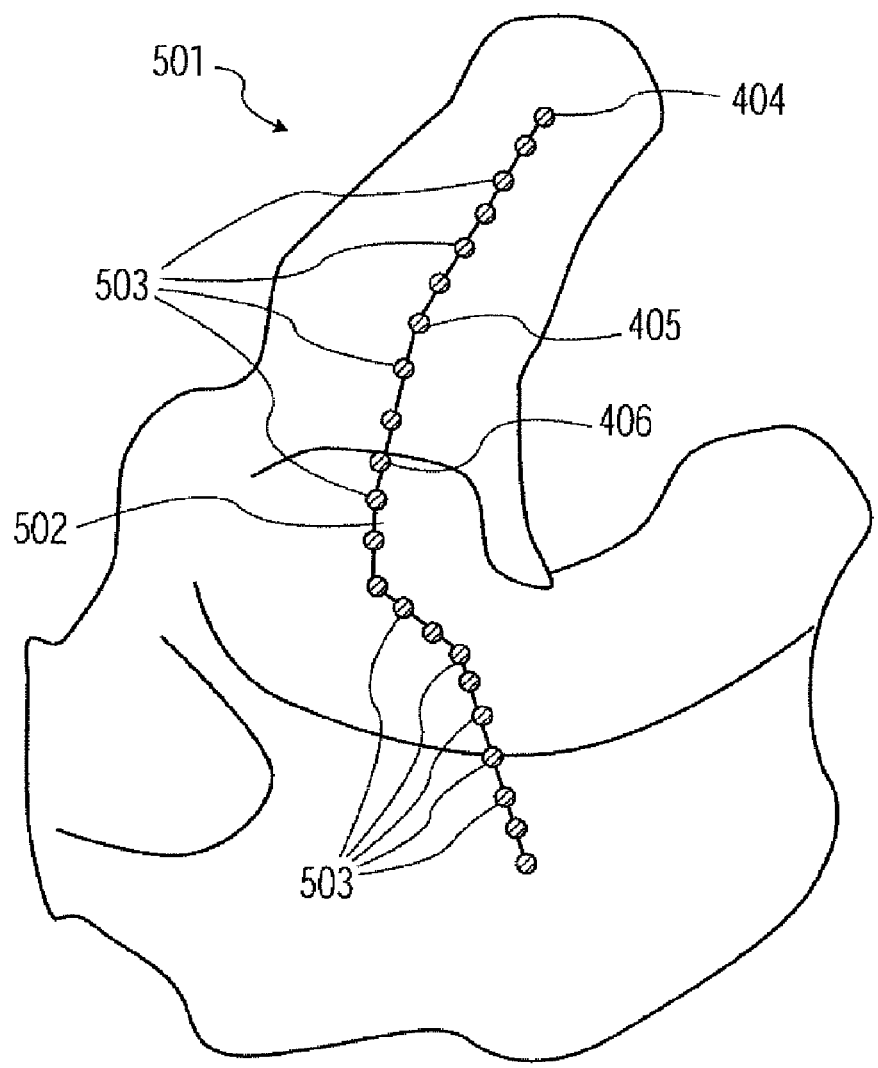
FIG. 5 shows an illustrative skeleton of the ear impression of FIG. 2.

Referring to FIG. 4, once the contour lines, such as contour lines 401-403 have been identified, in accordance with an embodiment of the present invention the center points 404-406, also referred to herein as centroids, of the shapes formed by the contour lines, respectively, are determined. Calculating centroids of shapes is well known in the art and, therefore, it will be well known to one skilled in the art how to calculate the centroids of such contour lines. In one such method, for example, each contour line can be approximated as one or more polygons, arcs, sectors, parabolic areas or other such areas for which methods of calculating the centroid are well known In accordance with this embodiment, once these centroids/center points are calculated, each center point is connected via a line with the center points of adjacent contour lines. For example, referring once again to FIG. 4, center point 404 is connected to center point 405 which is, in turn, connected to center point 406. This process of calculating and connecting the center points of contour lines is repeated for a desired number of contour lines in order to create a line representation, referred to herein as a skeleton, of the ear impression. Such a skeleton is shown in FIG. 5. Referring to that figure, ear impression 501, which is, for example, the same ear impression 300 from which horizontal slices were taken to identify contour lines, has skeleton 502 that is, once again, created by connecting the center points 503 of the contour lines, including center points 404, 405 and 406 of FIG. 4, as discussed above. One skilled in the art will recog-
nize that various numbers of contour lines and, hence, center points may be used to form the skeleton points of a skeleton in various implementations with advantageous results. Generally, the greater the number of skeleton points, the greater the accuracy of the registration. However, as the number of skeleton points increases, the greater the computer processing required to register two ear impressions. One skilled in the art will recognize how to select a desired number of skeleton points based on these factors.

Once the skeletons of each ear impression have been identified, a relationship between the points of each skeleton and points of identified feature areas of two different ear impressions is determined in order to determine which points on the first skeleton correspond with which points on the second skeleton to be registered. The present inventors have recognized that dynamic programming is useful for determining such correspondences. As is well known, dynamic programming is an algorithmic technique to solve an optimization problem by breaking a large problem down into subproblems so that, at any given stage, optimal solutions of subproblems are known. One skilled in the art will recognize that dynamic programming is a widely used technique in various applications to solve shortest path search problems. More particularly, the present inventors have recognized that it is advantageous to determine a distance measure, also referred to herein as a feature vector, between each skeleton and corresponding features such as, illustratively, the aperture, concha or other well-known features of the ear impressions, to facilitate an accurate identification of the correspondence of points between the two skeletons to be registered.

One illustrative method for identifying a feature, in this example the aperture of a point cloud representation of an ear impression, is described in U.S. patent application Ser. No. 11/462,869, titled Method and Apparatus for Aperture Detection of 3D Hearing Aid Shells which, as discussed herein above, is incorporated by reference herein in its entirety. One skilled in the art will recognize that, as discussed above, in addition to the aperture of a point cloud representation, points from other areas of an ear impression may be useful in the dynamic programming methods herein, such as points from the concha, canal or cymba regions of the representation or from other well-known areas of the impression such as the tragus, anti-tragus and anti-helix areas. One skilled in the art will also recognize that there are various manual and computer-assisted methods of identifying and locating these various features of the ear impression such as on the point cloud representation of FIG. 3.

Once identified, the points corresponding to the desired features of the ear impression can then be used to describe a measure of similarity between the two skeletons and, as a result, a reliable correspondence between skeleton points can be determined. In particular, a distance measure, or feature vector, is determined between the skeleton points and the points on the point cloud representation corresponding to one or more anatomical features of the ear impression. Such a feature vector contains the Euclidian distances from each skeleton point to each of the feature points. In one illustrative embodiment, the center point of an aperture of an ear impression and a point corresponding to the concha are advantageously used to derive these feature vectors for each skeleton point. More particularly, let (i, j) be an ordered point pair where i is an index from a feature point of a desired feature on a first ear impression to a point on the first skeleton and j is an index from a feature point of that feature to a point from a second skeleton. Let the local distance at (i, j) be given by m(i, j), then we can calculate M(i, j) as a global distance from a particular skeleton point up to feature point pair (i, j) as:

$$M(i,j) = \min[M(i-1,j-1), M(i-1,j), M(i,j-1)] + m(i,j) \quad \text{(Equation 1)}$$

Assuming that $M(1,1) = m(1,1)$ as an initial condition, one skilled in the art will recognize that Equation 1 provides an efficient recursive algorithm for computing $M(i, j)$. As a result, as one skilled in the art will also recognize in light of the foregoing, the final global distance $M(n, N)$ is an overall matching score of the first skeleton with a second skeleton. By adding a penalty to the distance measures $M(i-1, j)$ and $M(i, j-1)$ the probability that skeleton points on a first skeleton will be identified as corresponding with multiple points on a second skeleton is reduced. One skilled in the art will recognize that, in order to ensure there are no such multiple assignments or that there are no misassigned skeleton points, no backward paths are allowed. More particularly, if a point P of skeleton one at position i (such as point 405 in FIG. 4) is assigned to point P' of skeleton two at position k (such as point 406 in FIG. 4), then a subsequent point Q of skeleton one at position i+1 (such as below point 405) must not be assigned to a point Q' of skeleton two at position k−1 (such as above point 406). Accordingly, as one skilled in the art will recognize in light of the foregoing, the end output of dynamic programming is a matrix labeling the vectors from one skeleton to another that identify the distances and directions between the points on those skeletons. As a result, the points on one skeleton can be accurately matched with corresponding points on the other skeleton to be registered Once the corresponding points of the two skeletons and the associated feature vectors from each point to one or more features have been thus determined, registration can be accomplished by estimating the six registration parameters necessary to map a feature vector associated with one point on one of the skeletons, denoted vector $A_1$, to another feature vector associated with a corresponding point on the second skeleton, denoted vector $A_2$. These six registration parameters correspond to three-dimensional translation T parameters and three-dimensional rotation R parameters. As one skilled in the art will recognize, such parameters identify the necessary translations along the x, y and z axes, and the three-dimensional rotations about those axes, respectively, that are necessary to map one of the feature vectors onto the second feature vector. One skilled in the art will recognize that, while the present embodiment uses a particular rigid registration technique, explained herein below, other registration techniques using, for example, well-known closed form solutions or Newton methods on the energy function also be utilized to solve for the rigid registration parameters with equally advantageous results. In particular, using such parameters, it is possible to identify an energy function to penalize a distance measurement $L^2$. Measurement $L^2$ represents the sum of the squared distances between corresponding points of the two feature vectors to be registered, and that approaches zero as the second vector $A_2$ approaches alignment with the first vector $A_2$. Such an energy function can illustratively be defined by the expression:

$$E(R,T) = \|A_1 - (R*A_2 + T)\|^2 \quad \text{(Equation 2)}$$

The skeleton points can be represented as a set of 3D points such that $S_1 = [P_1, P_2 \ldots, P_p]$ and $S_2 = [Q_1, Q_2, \ldots, Q_q]$, where p and q are the number of points in each skeleton respectively, and $P_i = (X_i, Y_i, Z_i)$. Accordingly, Equation 2 becomes:

$$E = \sum_{i=1}^{n=\max(p,q)} w_i \|P_i - (R*Q_i + T)\|^2 \quad \text{(Equation 3)}$$

In Equation 2, the corresponding points from the two skeletons are in the summation of the Euclidean distances between the points of $S_1$ and transformed $S_2$. The term $w_i$ is a weighting factor that can be selected to provide more importance to specific regions on the skeleton, for example the skeleton points that correspond to the canal and/or aperture regions. Thus, one skilled in the art will recognize that $w_i$ can be defined as a discrete function with varying weights over the skeleton points that is useful in biasing the registration towards matching of specific anatomical regions. For simplicity, assume herein that $w_i = 1$. Then, the first variation of Equation 2 with regard to the translation parameters $T^k$, $k = 1, \ldots, 3$ is given by the expression:

$$\frac{\partial T^k}{\partial t} = \sum_{i=1}^{n} <[P_i - (R*Q_i + T)], \frac{\partial T}{\partial T^k}> \quad \text{(Equation 4)}$$

where $$\frac{\partial T}{\partial T^1} = \begin{pmatrix} 1 \\ 0 \\ 0 \end{pmatrix}, \frac{\partial T}{\partial T^2} = \begin{pmatrix} 0 \\ 1 \\ 0 \end{pmatrix}, \frac{\partial T}{\partial T^3} = \begin{pmatrix} 0 \\ 0 \\ 1 \end{pmatrix}$$

and $<\bullet, \bullet>$ denotes an inner product in 3D Euclidean space.

Therefore, gradient descent flows to update the translation parameters are defined by:

$$\frac{\partial T^1}{\partial t} = \sum_{i=1}^{n} <[P_i - (R*Q_i + T)], \begin{pmatrix} 1 \\ 0 \\ 0 \end{pmatrix}>, \quad \text{(Equation 5)}$$

$$\frac{\partial T^2}{\partial t} = \sum_{i=1}^{n} <[P_i - (R*Q_i + T)], \begin{pmatrix} 0 \\ 1 \\ 0 \end{pmatrix}>, \quad \text{(Equation 6)}$$

and $$\frac{\partial T^3}{\partial t} = \sum_{i=1}^{n} <[P_i - (R*Q_i + T)], \begin{pmatrix} 0 \\ 0 \\ 1 \end{pmatrix}>. \quad \text{(Equation 7)}$$

In accordance with another embodiment, in order to define rotation of the skeleton point set in 3D, we use exponential coordinates, also known in the art as twist coordinates, where a 3D vector $w = (w_1, w_2, w_3)$ represents the rotation matrix. Using the 3D w vector, one can perform operations such as obtaining derivations on the rotations for the 3D translation vector T. A skew symmetric matrix corresponding to w can then be given by the expression:

$$\hat{w} = \begin{bmatrix} 0 & -w_3 & w_2 \\ w_3 & 0 & -w_1 \\ -w_2 & w_1 & 0 \end{bmatrix} \quad \text{(Equation 8)}$$

and the rotation matrix can be defined by $R = e^{\hat{w}}$. Then the first variation of Equation 3 with regard to rotation parameters is given by the expression:

$$\frac{\partial w^k}{\partial t} = \sum_{i=1}^{n} <[P_i - (R*Q_i + T)], R*\frac{\partial \hat{w}}{\partial w^k}Y_i> \quad \text{(Equation 9)}$$

where $$\frac{\partial \hat{w}}{\partial w^1}Q = \begin{pmatrix} 0 \\ -Z_i \\ Y_i \end{pmatrix}, \frac{\partial \hat{w}}{\partial w^2}Q_i = \begin{pmatrix} Z_i \\ 0 \\ -X_i \end{pmatrix}, \frac{\partial \hat{w}}{\partial w^3}Q_i = \begin{pmatrix} -Y_i \\ X_i \\ 0 \end{pmatrix}$$

and the update equations for the rotation parameters are thus defined by:

$$\frac{\partial w^1}{\partial t} = \sum_{i=1}^{n} <[P_i - (R*Q_i + T)], R*\begin{pmatrix} 0 \\ -Z_i \\ Y_i \end{pmatrix}>, \quad \text{(Equation 10)}$$

$$\frac{\partial w^2}{\partial t} = \sum_{i=1}^{n} <[P_i - (R*Q_i + T)], R*\begin{pmatrix} Z_i \\ 0 \\ -X_i \end{pmatrix}>, \quad \text{(Equation 11)}$$

and $$\frac{\partial w^3}{\partial t} = \sum_{i=1}^{n} <[P_i - (R*Q_i + T)], R*\begin{pmatrix} -Y_i \\ X_i \\ 0 \end{pmatrix}>. \quad \text{(Equation 12)}$$

One skilled in the art will note that, as an initial condition, it is assumed $T^1=0$, $T^2=0$, $T^3=0$, and similarly, $w^1=0$, $w^2=0$, $w^3=0$, which is equivalent to $R=I$ (an identity matrix). Each time $w=(w_1, w_2, w_3)$ is updated, a new rotation matrix can be computed as:

$$R = \cos(t)I + \sin(t)\hat{w}^* + (1-\cos(t))w^*w^{*T}$$

where $t=\|w\|$, and $w^*=w/t$. As one skilled in the art will recognize, the gradient descent method represented by equations 5-7 and 10-12 above, well known in the art, can be used to optimize the motion parameters. In other words, once the registration parameters T and w have been updated, new values of T and R are used in the update equations at the next iteration.

Figure 6:
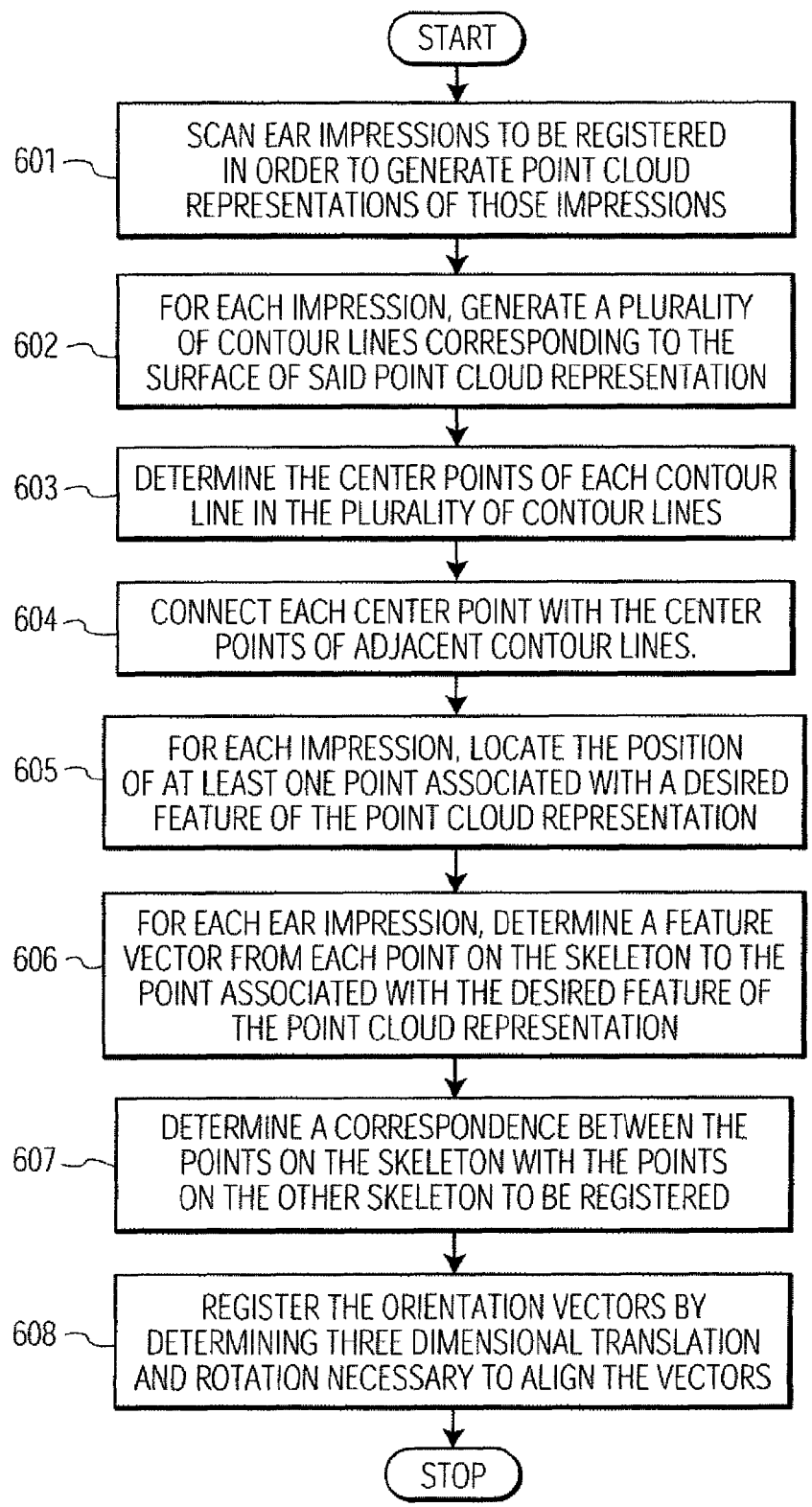
FIG. 6 is a flow chart showing the steps of a method in accordance with an embodiment of the present invention.

FIG. 6 shows a method in accordance with one embodiment of the present invention. Referring to that figure at step 601, ear impressions, such as the ear impressions associated with both ears of a patient, are scanned using, for example, a well-known laser scanning method to generate a point cloud representation of the ear impressions. Then, at step 602, for each ear impression contour lines are generated corresponding to the surface of the point cloud representation. As described herein above, these contour lines may be obtained by positioning the point cloud representation in a desired orientation and then detecting the intersection of the point cloud representation and a plane at different levels along, illustratively, a vertical axis of the point cloud representation. Next, at step 603, the center points of each contour line are determined and, at step 604, these center points are connected with the center points of adjacent contour lines to form a skeleton representing the ear impressions to be registered. Once the skeletons have been identified then, at step 605, one or more points corresponding to one or more features are identified for each ear impression. Next, at step 606, feature vectors for each point on the skeleton are determined representing the distance and direction of those skeleton points to the one or more features. At step 607, the feature vectors of one skeleton are used to determine a correspondence of the associated points with the points on the other skeleton to be registered. Finally, at step 608, the two skeletons are registered using the weighted sum of squared distances criteria between the skeleton points. This is accomplished, for example, by determining the three-dimensional components of translation and rotation necessary to align corresponding feature vectors of one point cloud representation of one ear impression with the feature vectors of the point cloud representation of the other ear impression.

Figure 7:
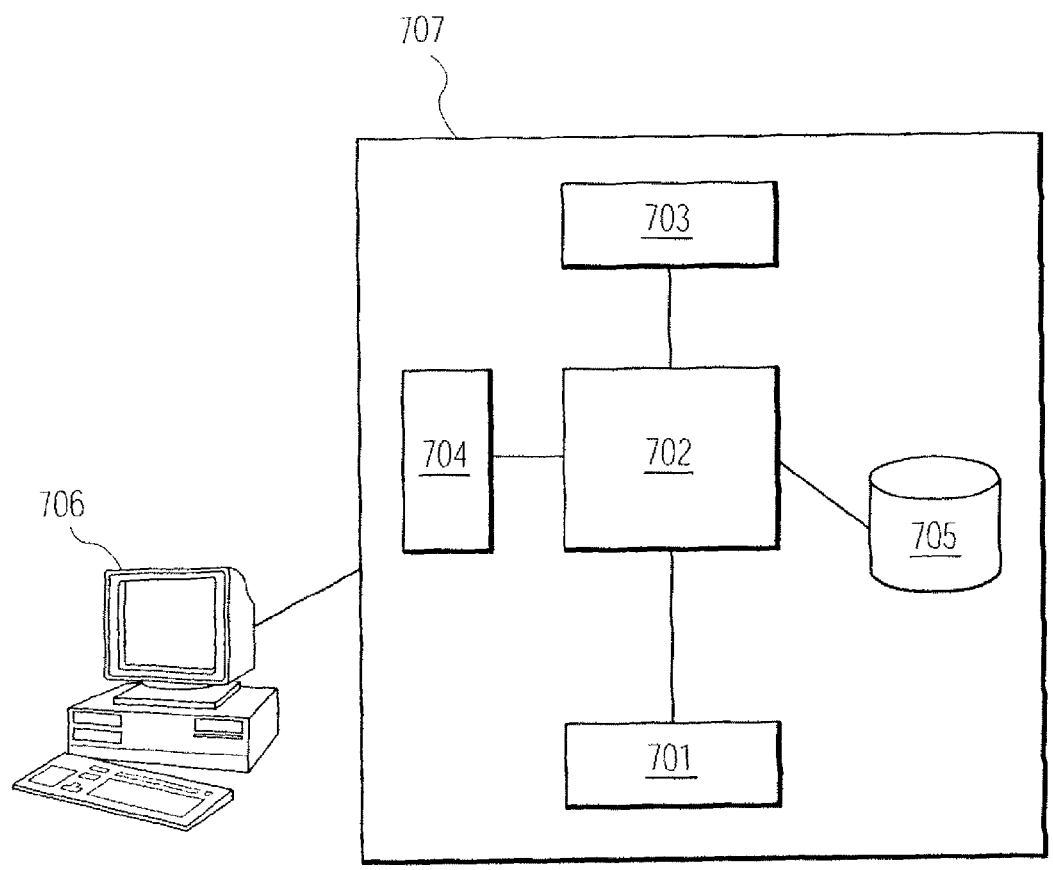
FIG. 7 shows a computer adapted to perform the illustrative steps of the method of FIG. 6 as well as other functions associated with the registration of point cloud representations of ear impressions.

The foregoing embodiments are generally described in terms of manipulating objects, such as lines, planes and three-dimensional shapes associated with ear impression feature identification and ear impression registration. One skilled in the art will recognize that such manipulations may be, in various embodiments, virtual manipulations accomplished in the memory or other circuitry/hardware of an illustrative registration system. Such a registration system may be adapted to perform these manipulations, as well as to perform various methods in accordance with the above-described embodiments, using a programmable computer running software adapted to perform such virtual manipulations and methods. An illustrative programmable computer useful for these purposes is shown in FIG. 7. Referring to that figure, such a registration system 707 may be implemented on any suitable computer adapted to receive, store and transmit data such as the aforementioned positional information. Specifically, illustrative registration system 707 may have, for example, a processor 702 (or multiple processors) which controls the overall operation of the registration system 707. Such operation is defined by computer program instructions stored in a memory 703 and executed by processor 702. The memory 703 may be any type of computer readable medium, including without limitation electronic, magnetic, or optical media. Further, while one memory unit 703 is shown in FIG. 7, it is to be understood that memory unit 703 could comprise multiple memory units, with such memory units comprising any type of memory. Registration system 707 also comprises illustrative modem 701 and network interface 704. Registration system 707 also illustratively comprises a storage medium, such as a computer hard disk drive 705 for storing, for example, data and computer programs adapted for use in accordance with the principles of the present invention as described hereinabove. Finally, registration system 707 also illustratively comprises one or more input/output devices, represented in FIG. 7 as terminal 706, for allowing interaction with, for example, a technician or database administrator. One skilled in the art will recognize that registration system 707 is merely illustrative in nature and that various hardware and software components may be adapted for equally advantageous use in a computer in accordance with the principles of the present invention.

One skilled in the art will also recognize that the software stored in the computer system of FIG. 7 may be adapted to perform various tasks in accordance with the principles of the present invention. In particular, such software may be graphical software adapted to import surface models from anatomical structures, for example those models generated from three-dimensional laser scanning of ear impression mode. In addition, such software may allow for selective editing of those models in a way that allows a user to remove or reshape various portions of those anatomical models as described above. The computer system may be adapted to automatically generate points associated with a feature, such as the aperture, of ear impressions so as to create a vector describing the shape and orientation of the feature in three-dimensional space. Such software may also function to automatically register that feature with a corresponding feature on another ear impression by calculating the three dimensional translation and rotation of the vector in order to align one ear impression model with another. The software of a computer-based system such as registration system 707 may also be adapted to perform other functions which will be obvious in light of the teachings herein. All such functions are intended to be contemplated by these teachings.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for registering a first graphical representation of a first ear impression with a second graphical representation of a second ear impression, said method comprising:
   generating a first skeleton of said first graphical representation of said first ear impression, wherein said first skeleton is a line representation of said first graphical representation;
   generating a second skeleton of said second graphical representation of said second ear impression, wherein said second skeleton is a line representation of said second graphical representation;
   generating a first feature vector representing a distance and a direction from a point on said first skeleton to a point on a first feature of said first graphical representation;
   generating a second feature vector identifying a distance and a direction from a point on said second skeleton to a point on a second feature of said second graphical representation;
   identifying a relationship between a point on said first skeleton and a point on said second skeleton as a function of said first feature vector and said second feature vector; and
   determining a translation and a rotation of said first feature vector to achieve alignment of said first skeleton with said second skeleton.

2. The method of claim 1 wherein said step of generating a first feature vector comprises the steps of:
   determining a first plurality of contour lines on a surface of said first graphical representation;
   calculating a first center point of a contour line in said first plurality of contour lines;
   determining a point on said first feature of said first graphical representation; and
   calculating the distance and direction from said first center point to said point on said first feature.

3. The method of claim 2 wherein said step of generating a second feature vector comprises the steps of:
   determining a second plurality of contour lines on a surface of said second graphical representation;
   calculating a second center point of a contour line in said second plurality of contour lines;
   determining a point on said second feature of said second graphical representation; and
   calculating the distance and direction from said second center point to said point on said second feature.

4. The method of claim 3 wherein said first feature comprises an aperture of said first graphical representation.

5. The method of claim 3 wherein said second feature comprises an aperture of said second graphical representation.

6. The method of claim 1 wherein said first graphical representation comprises a representation of a first plurality of points located on a surface of said first ear impression and said second graphical representation comprises a representation of a second plurality of points located on a surface of said second ear impression.

7. The method of claim 1 wherein said first and second graphical representations are generated by scanning the surfaces of said first and second ear impressions, respectively.

8. The method of claim 1 wherein said translation is determined according to the expression:

$$\frac{\partial T^k}{\partial t} = \sum_{i=1}^{n} <[P_i - (R*Q_i + T)], \frac{\partial T}{\partial T^k}>$$

where $$\frac{\partial T}{\partial T^1} = \begin{pmatrix} 1 \\ 0 \\ 0 \end{pmatrix}, \frac{\partial T}{\partial T^2} = \begin{pmatrix} 0 \\ 1 \\ 0 \end{pmatrix}, \frac{\partial T}{\partial T^3} = \begin{pmatrix} 0 \\ 0 \\ 1 \end{pmatrix}$$

and where T is a translation parameter; R is a rotation parameter; $P_i$ and $Q_i$ are points in a set of three dimensional points representing skeletons of a first and a second ear impression, respectively; and k is the number of the translation parameter where k∈1, 2, 3.

9. The method of claim 1 wherein said rotation is determined according to the expression:

$$\frac{\partial w^k}{\partial t} = \sum_{i=1}^{n} <[P_i - (R*Q_i + T)], R*\frac{\partial \hat{w}}{\partial w^k}Q_i>$$

where $$\frac{\partial \hat{w}}{\partial w^1}Q_i = \begin{pmatrix} 0 \\ -Z_i \\ Y_i \end{pmatrix}, \frac{\partial \hat{w}}{\partial w^2}Q_i = \begin{pmatrix} Z_i \\ 0 \\ -X_i \end{pmatrix}, \frac{\partial \hat{w}}{\partial w^3}Q_i = \begin{pmatrix} -Y_i \\ X_i \\ 0 \end{pmatrix}$$

and where T is a translation parameter; R is a rotation parameter; $P_i=(X_i, Y_i, Z_i)$ and $Q_i=(X_i, Y_i, Z_i)$ are three dimensional position vectors and $Z_i$ are points of the three dimensional position vector $Q_i=(X_i, Y_i, Z_i)$; and k is the number of the rotation parameter where k∈1, 2, 3.

10. An apparatus for registering a first graphical representation of a first ear impression with a second graphical representation of a second ear impression, said apparatus comprising:
   means for generating a first skeleton of said first graphical representation of said first ear impression, wherein said first skeleton is a line representation of said first graphical representation;
   means for generating a second skeleton of said second graphical representation of said second ear impression, wherein said second skeleton is a line representation of said second graphical representation;
   means for generating a first feature vector identifying a distance and a direction from a point on said first skeleton to a point on a first feature of said first graphical representation;

means for generating a second feature vector identifying a distance and a direction from a point on said second skeleton to a point on a second feature of said second graphical representation;

means for identifying a relationship between a point on said first skeleton and a point on said second skeleton as a function of said first feature vector and said second feature vector; and means for determining a translation and a rotation of said first feature vector to achieve alignment of said first skeleton with said second skeleton.

11. The apparatus of claim 10 wherein said means for generating a first feature vector comprises:

means for determining a first plurality of contour lines on a surface of said first graphical representation;

calculating a first center point of a contour line in said first plurality of contour lines;

means for determining a point on said first feature of said first graphical representation; and means for calculating the distance and direction from said first center point to said point on said first feature.

12. The apparatus of claim 11 wherein said step of generating a second feature vector comprises:

means for determining a second plurality of contour lines on a surface of said second graphical representation;

calculating a second center point of a contour line in said second plurality of contour lines;

means for determining a point on said second feature of said second graphical representation; and means for calculating the distance and direction from said second center point to said point on said second feature.

13. The apparatus of claim 12 wherein said first feature comprises an aperture of said first graphical representation.

14. The apparatus of claim 12 wherein said second feature comprises an aperture of said second graphical representation.

15. The apparatus of claim 10 wherein said first graphical representation comprises a representation of a first plurality of points located on a surface of said first ear impression and said second graphical representation comprises a representation of a second plurality of points located on a surface of said second ear impression.

16. The apparatus of claim 10 wherein said first and second graphical representations are generated by scanning the surfaces of said first and second ear impressions, respectively.

17. The apparatus of claim 10 wherein said translation is determined according to the expression:

$$\frac{\partial T^k}{\partial t} = \sum_{i=1}^{n} < [P_i - (R*Q_i + T)], \frac{\partial T}{\partial T^k} >$$

where $$\frac{\partial T}{\partial T^1} = \begin{pmatrix} 1 \\ 0 \\ 0 \end{pmatrix}, \frac{\partial T}{\partial T^2} = \begin{pmatrix} 0 \\ 1 \\ 0 \end{pmatrix}, \frac{\partial T}{\partial T^3} = \begin{pmatrix} 0 \\ 0 \\ 1 \end{pmatrix}$$

and where T is a translation parameter; R is a rotation parameter; $P_i$ and $Q_i$ are points in a set of three dimensional points representing skeletons of a first and a second ear impression, respectively; and k is the number of the translation parameter where k∈1, 2, 3.

18. The apparatus of claim 10 wherein said rotation is determined according to the expression:

$$\frac{\partial w^k}{\partial t} = \sum_{i=1}^{n} < [P_i - (R*Q_i + T)], R*\frac{\partial \hat{w}}{\partial w^k}Q_i >$$

where $$\frac{\partial \hat{w}}{\partial w^1}Q_i = \begin{pmatrix} 0 \\ -Z_i \\ Y_i \end{pmatrix}, \frac{\partial \hat{w}}{\partial w^2}Q_i = \begin{pmatrix} Z_i \\ 0 \\ -X_i \end{pmatrix}, \frac{\partial \hat{w}}{\partial w^3}Q_i = \begin{pmatrix} -Y_i \\ X_i \\ 0 \end{pmatrix}$$

and where T is a translation parameter; R is a rotation parameter; $P_i=(X_i, Y_i, Z_i)$ and $Q_i=(X_i, Y_i, Z_i)$ are three dimensional position vectors and $Z_i$ are points of the three dimensional position $Q_i=(X_i, Y_i, Z_i)$; and k is the number of the rotation parameter where k∈1, 2, 3.

19. A computer readable medium non-transitory comprising computer program instructions which, when executed by a processor, perform the steps of a method for registering a first graphical representation of a first ear impression with a second graphical representation of a second ear impression, said steps comprising:

generating a first skeleton of said first graphical representation of said first ear impression, wherein said first skeleton is a line representation of said first graphical representation;

generating a second skeleton of said second graphical representation of said second ear impression, wherein said second skeleton is a line representation of said second graphical representation;

generating a first feature vector identifying a distance and a direction from a point on said first skeleton to a point on a first feature of said first graphical representation;

generating a second feature vector identifying a distance and a direction from a point on said second skeleton to a point on a second feature of said second graphical representation;

identifying a relationship between a point on said first skeleton and a point on said second skeleton as a function of said first feature vector and said second feature vector; and determining a translation and a rotation of said first feature vector to achieve alignment of said first skeleton with said second skeleton.

20. The computer readable medium non-transitory of claim 19 wherein said computer program instruction defining the step of generating a first feature vector comprises the steps of:

determining a first plurality of contour lines on a surface of said first graphical representation;

calculating a first center point of a contour line in said first plurality of contour lines;

determining a point on a first feature of said first graphical representation; and calculating the distance and direction from said first center point to said point on a first feature.

21. The computer readable medium non-transitory of claim 20 wherein said computer program instruction defining the step of generating a second feature vector comprises the steps of:

determining a second plurality of contour lines on a surface of said second graphical representation;

calculating a second center point of a contour line in said second plurality of contour lines;

determining a point on a second feature of said second graphical representation; and calculating the distance and direction from said second center point to said point on a second feature.

22. The computer readable medium non-transitory of claim 21 wherein said first feature comprises an aperture of said first graphical representation.

23. The computer readable medium non-transitory of claim 21 wherein said second feature comprises an aperture of said second graphical representation.

24. The computer readable medium non-transitory of claim 19 wherein said first graphical representation comprises a representation of a first plurality of points located on a surface of said first ear impression and said second graphical representation comprises a representation of a second plurality of points located on a surface of said second ear impression.

25. The computer readable medium non-transitory of claim 19 wherein said first and second graphical representations are generated by scanning the surfaces of said first and second ear impressions, respectively.

26. The computer readable medium non-transitory of claim 19 wherein said translation is determined according to the expression:

$$\frac{\partial T^k}{\partial t} = \sum_{i=1}^{n} < [P_i - (R * Q_i + T)], \frac{\partial T}{\partial T^k} >$$

where $$\frac{\partial T}{\partial T^1} = \begin{pmatrix} 1 \\ 0 \\ 0 \end{pmatrix}, \frac{\partial T}{\partial T^2} = \begin{pmatrix} 0 \\ 1 \\ 0 \end{pmatrix}, \frac{\partial T}{\partial T^3} = \begin{pmatrix} 0 \\ 0 \\ 1 \end{pmatrix}$$

and where T is a translation parameter; R is a rotation parameter; $P_i$ and $Q_i$ are points in a set of three dimensional points representing skeletons of a first and a second ear impression, respectively; and k is the number of the translation parameter where k∈1, 2, 3.

27. The computer readable medium non-transitory of claim 19 wherein said rotation is determined according to the expression:

$$\frac{\partial w^k}{\partial t} = \sum_{i=1}^{n} < [P_i - (R * Q_i + T)], R * \frac{\partial \hat{w}}{\partial w^k} Q_i >$$

where $$\frac{\partial \hat{w}}{\partial w^1} Q_i = \begin{pmatrix} 0 \\ -Z_i \\ Y_i \end{pmatrix}, \frac{\partial \hat{w}}{\partial w^2} Q_i = \begin{pmatrix} Z_i \\ 0 \\ -X_i \end{pmatrix}, \frac{\partial \hat{w}}{\partial w^3} Q_i = \begin{pmatrix} -Y_i \\ X_i \\ 0 \end{pmatrix}$$

and where T is a translation parameter; R is a rotation parameter; $P_i=(X_i, Y_i, Z_i)$ and $Q_i=(X_i, Y_i, Z_i)$ are three dimensional position vectors and $Z_i$ are points of the three dimensional position vector $Q_i=(X_i, Y_i, Z_i)$; and k is the number of the rotation parameter where k∈1, 2, 3.

* * * * *